(12) United States Patent
Jeong et al.

(10) Patent No.: US 7,307,677 B2
(45) Date of Patent: Dec. 11, 2007

(54) LARGE DISPLAY DEVICE AND FABRICATION METHOD THEREOF

(75) Inventors: Young Sik Jeong, Seoul (KR); Hyun Suk Jin, Goonpo-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 222 days.

(21) Appl. No.: 10/960,951

(22) Filed: Oct. 12, 2004

(65) Prior Publication Data
US 2005/0122032 A1 Jun. 9, 2005

(30) Foreign Application Priority Data
Dec. 8, 2003 (KR) .................. 10-2003-0088560

(51) Int. Cl.
*G02F 1/133* (2006.01)
(52) U.S. Cl. ................................... 349/73
(58) Field of Classification Search ........... 349/153, 349/190, 158.73
See application file for complete search history.

(56) References Cited

U.S. PATENT DOCUMENTS

| | | | |
|---|---|---|---|
| 5,812,226 A | * | 9/1998 | Izumi et al. .............. 349/73 |
| 5,847,785 A | | 12/1998 | Izumi |
| 6,078,379 A | * | 6/2000 | Nagae et al. .............. 349/155 |
| 6,417,898 B1 | * | 7/2002 | Izumi .......................... 349/73 |
| 2002/0030769 A1 | | 3/2002 | Bae |

FOREIGN PATENT DOCUMENTS

| | | |
|---|---|---|
| JP | 2-93518 A | 4/1990 |
| JP | 8-184849 A | 7/1996 |

* cited by examiner

*Primary Examiner*—James A. Dudek
(74) *Attorney, Agent, or Firm*—McKenna, Long & Aldridge LLP

(57) ABSTRACT

A tiling mode display device is disclosed. The display device includes a first substrate having at least two lower substrates connected to each other at a boundary region between the lower substrates using a first adhesion member; a first seal pattern formed at peripheries of the lower substrates, and a second seal pattern formed at the boundary region between the lower substrates; and a second substrate attached to the first substrate by the first and second seal patterns.

10 Claims, 16 Drawing Sheets

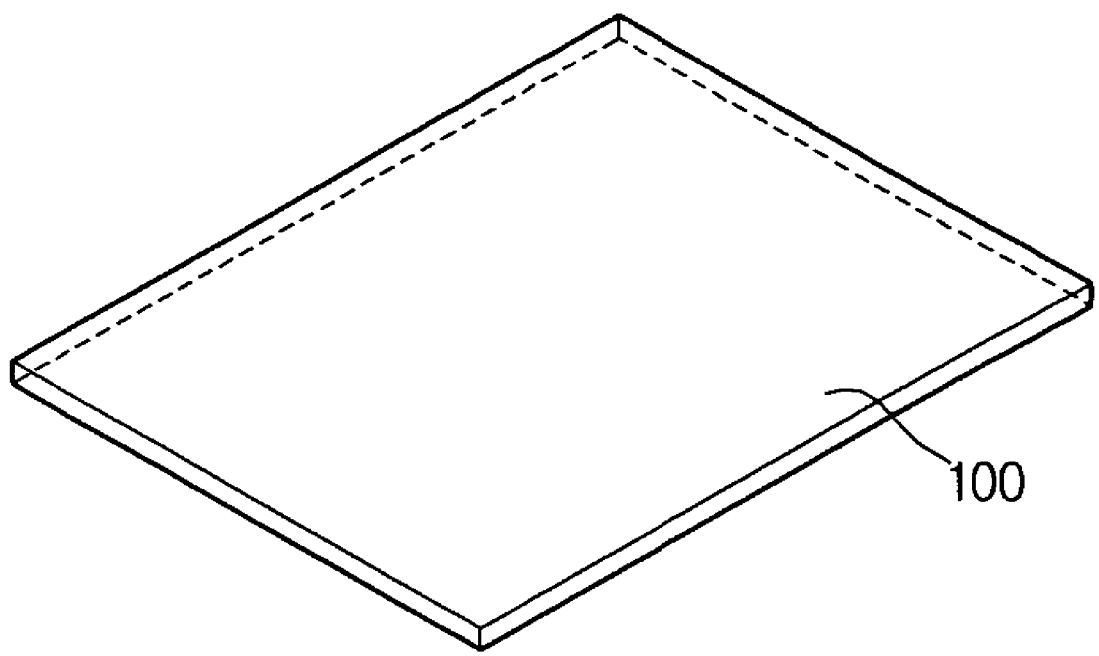

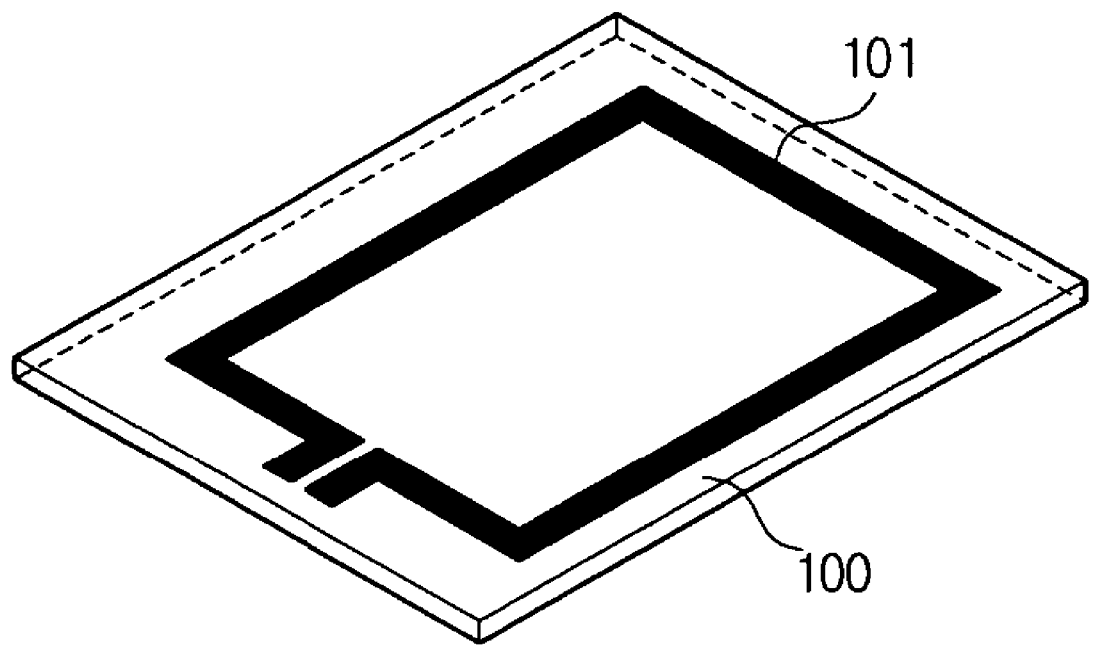

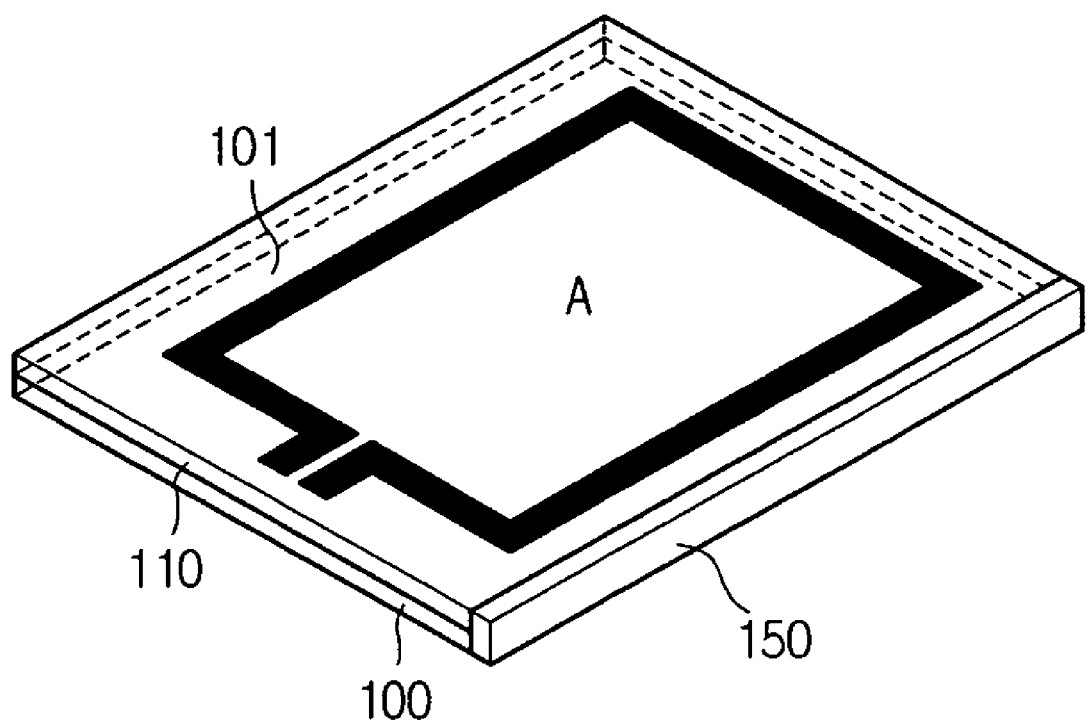

LARGE DISPLAY DEVICE AND FABRICATION METHOD THEREOF

This application claims the benefit of Korean Patent Application No. 2003-88560, filed on Dec. 8, 2003, which is hereby incorporated by reference for all purposes as if fully set forth herein.

BACKGROUND OF THE INVENTION

1. Field of the Invention

The present invention relates to a large-size tiling mode display device and a fabrication method thereof that can reduce the size of non-display areas.

2. Discussion of the Related Art

Among display devices for displaying image information on a screen, a Braun tube display device (or CRT: cathode ray tube) has generally been used. However, the CRT has several disadvantages such as its large size and weight when considering its display area. Accordingly, a flat panel display device, which can be easily used anywhere due to its slimness, has been developed, and is gradually substituting the Braun tube display device. Specifically, a liquid crystal display device (LCD) has an excellent resolution than other flat panel display devices, and the response time of the LCD device has become almost as fast as the Braun tube display device, when displaying moving pictures.

The principles of the optical anisotropy and polarization of liquid crystal are employed in driving such a LCD device. Because liquid crystal has an elongate structure, it has a direction of a molecule array. The direction of the molecule array can be controlled by artificially applying an electric field to the liquid crystal. When the direction of the molecule array is controlled by such an electric field, light is refracted in the direction of the molecule array due to the optical anisotropy of the liquid crystal, thereby displaying images.

Among the various types of the LCD device, there is a tiling mode LCD device, in which a plurality of LCD panels arrayed and connected to each other operate as one large display device.

FIG. 1 is a schematic view illustrating a tiling mode large display device according to a related art.

Referring to FIG. 1, the tiling mode large display device has a first LCD panel (A) and a second LCD panel (B). Here, the LCD panels (A) and (B) are connected to each other with a junction region (M) provided therebetween. The junction region (M) occupies a predetermined space, and is a non-display region in which images are not displayed during the operation. Accordingly, it is desirable that the size of the junction region (M) be reduced.

FIGS. 2A to 2E are views illustrating a method of fabricating the tiling mode display device according to a related art.

Referring to FIG. 2A, a lower substrate 100 is prepared to form a LCD panel. Then, a seal pattern 101 is formed at an outer part of the lower substrate 100, and a liquid crystal injection hole is provided at a predetermined position to inject a liquid crystal, as shown in FIG. 2B. Next, as shown in FIG. 2C, a upper substrate 110 is attached to the lower substrate 100, and the liquid crystal is injected between the upper and lower substrates through the injection hole to form a LCD panel (A). After that, as shown in FIG. 2D, an adhesion member 150 is provided at one side surface of the LCD panel (A). Next, another LCD panel (B) formed through the processes described in FIGS. 2A to 2C is connected to the LCD panel (A) by the adhesion member 150, thereby forming one large-size tiling mode display device, as shown in FIG. 2E.

FIG. 3 is a schematic sectional view taken along the line I-I' in FIG. 2E.

Referring to FIG. 3, the first LCD panel (A) and the second LCD panel (B) are connected to each other by the adhesion member 150, and each of the seal patterns 101 is formed on the respective LCD panel. Accordingly, the large-size tiling mode display device having the first LCD panel (A) and the second LCD panel (B) has a junction region (M), which is in a non-display region and almost extends to the regions of the seal pattern 101 and the adhesion member 150.

Accordingly, studies are in progress on an adhesion processing technology to reduce the size of the junction region, which is a non-display region of the large display device, and to enhance the adhesion between the LCD panels.

SUMMARY OF THE INVENTION

Accordingly, the present invention is directed to a large-size tiling mode display device and a fabrication method thereof that substantially obviate one or more of the problems due to limitations and disadvantages of the related art.

An advantage of the present invention is to provide a large-size tiling mode display device and a fabrication method thereof that can reduce the size of non-display areas.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a display device includes a first substrate having at least two lower substrates connected to each other at a boundary region between the lower substrates using a first adhesion member; a first seal pattern formed at peripheries of the lower substrates, and a second seal pattern formed at the boundary region between the lower substrates; and a second substrate attached to the first substrate by the first and second seal patterns.

In another aspect of the present invention, a method of fabricating a display device includes connecting at least two lower substrates to each other at a boundary region between the two lower substrates to form a first substrate using a first adhesion member; forming a first seal pattern at peripheries of the lower substrates, and at the same time forming a second seal pattern at the boundary region; attaching a second substrate to the first substrate using the first and second seal patterns; and providing a liquid crystal between the attached first and second substrates.

In yet another aspect of the present invention, a method of fabricating a large display device includes adhering at least two lower substrates to each other at one side to form a first substrate having a boundary provided between the lower substrates; forming a first seal pattern at peripheries of the lower substrates, and forming a second seal pattern at the boundary between the lower substrates; dropping a liquid crystal to fill a space defined by the first seal pattern and the second seal pattern of the first substrate; and facing and attaching a second substrate to the first substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 2A to 2E are views illustrating a method of fabricating the tiling mode display device according to a related art;

DETAILED DESCRIPTION OF THE ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

Figure 1:
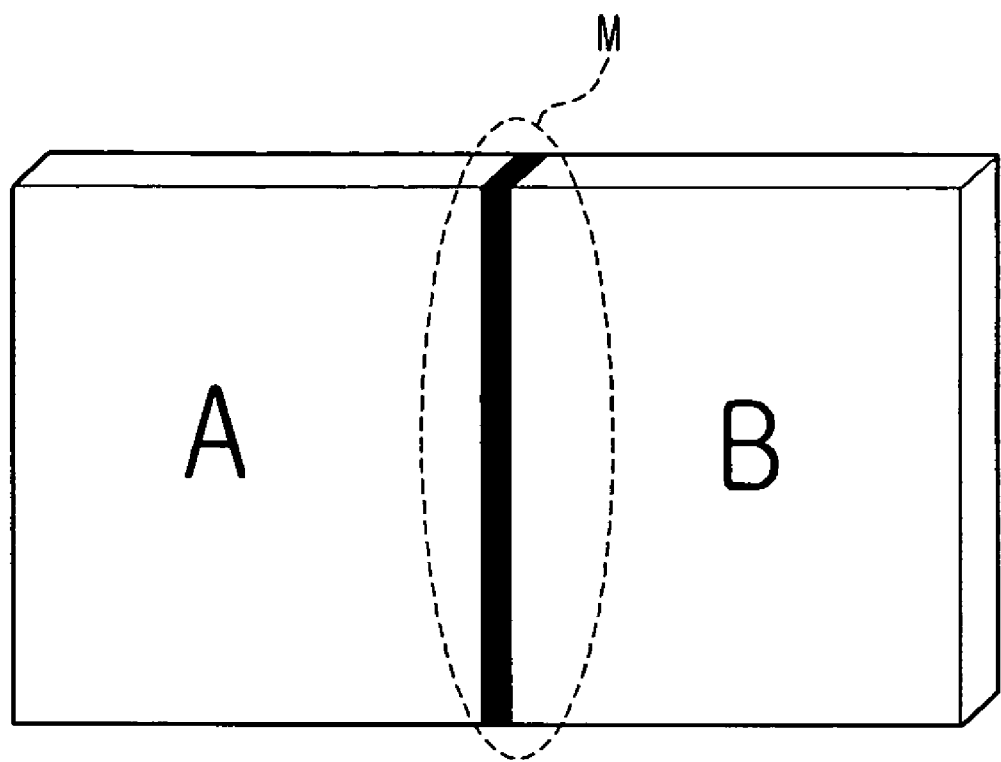
FIG. 1 is a schematic view illustrating a large-size tiling mode display device according to a related art.
Figure 2C:
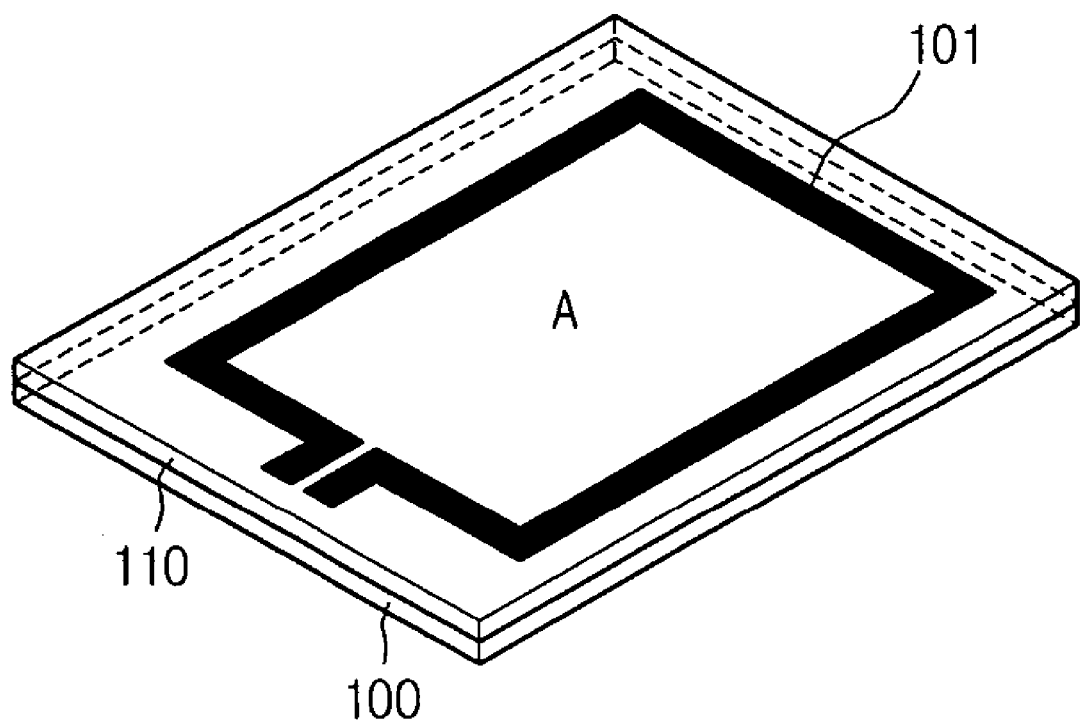
Figure 2E:
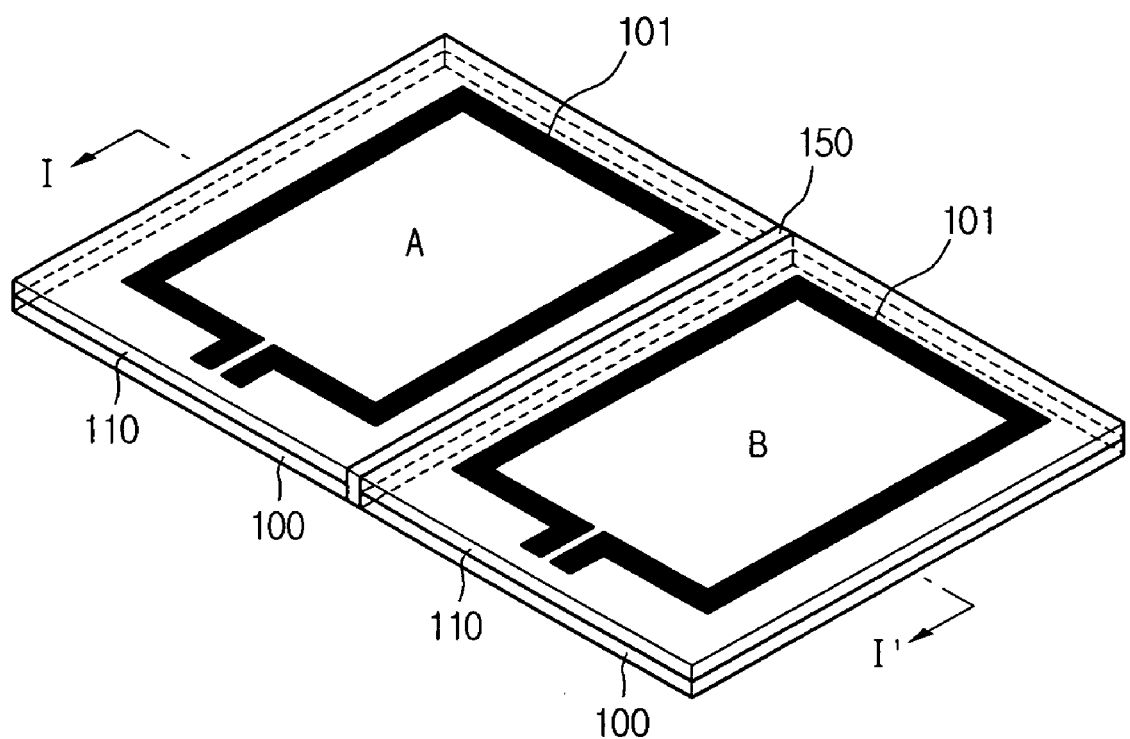
Figure 3:
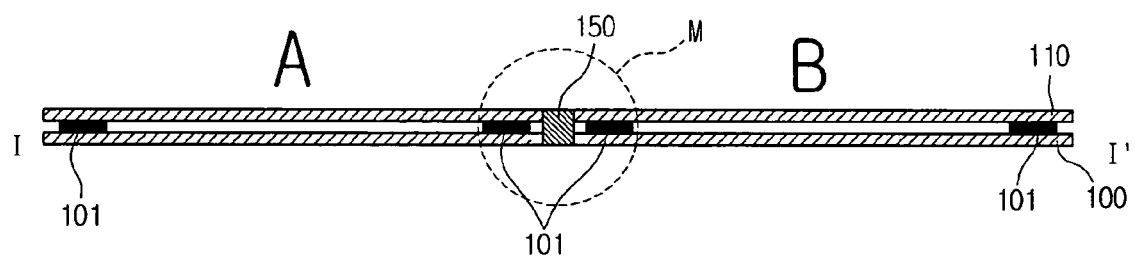
FIG. 3 is a schematic sectional view taken along the line I-I' in FIG. 2E.
Figure 4:
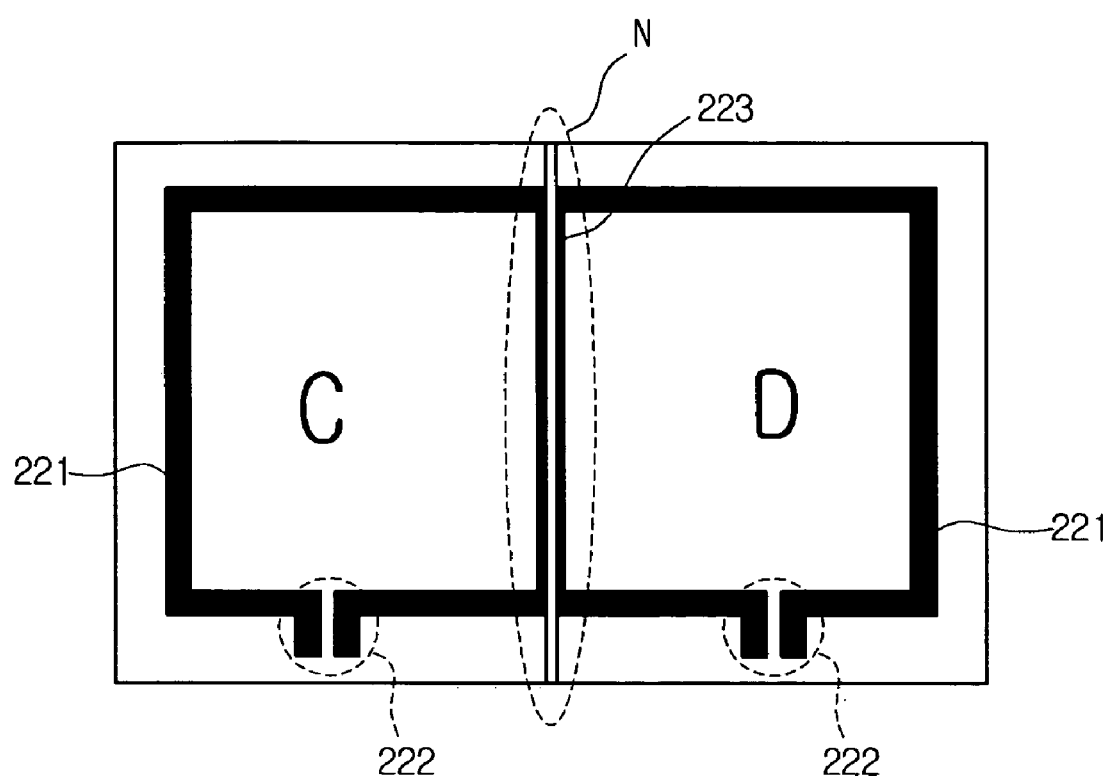
FIG. 4 is a schematic view illustrating a large-size tiling mode display device according to an embodiment of the present invention.

FIG. 4 is a schematic view illustrating a large-size tiling mode display device according to an embodiment of the present invention.

Referring to FIG. 4, the tiling mode display device includes a first LCD panel (C) and a second LCD panel (D) connected to each other with a junction region (N). In general, a tiling mode display device has one large display panel that includes a plurality of small lower substrates connected to either a plurality of small upper substrates or one large upper substrate. However, for convenience of explanation, the term LCD panel is used to describe each of the small substrates connected to either a plurality of small upper substrates or one large upper substrate when describing the tiling mode display device according to the present invention. Here, each of the LCD panels (C) and (D) has a upper substrate and a lower substrate (not shown) facing each other, with the upper and lower substrates being attached to each other by a first seal pattern 221. The tiling mode display device further includes a second seal pattern 223 in the junction region (N). A size of the second seal pattern 223 is about less than about 1100 μm. A liquid crystal (not shown) is provided in an internal space provided by the first seal pattern 221 and the second seal pattern 223. The liquid crystal is injected into the internal space through a liquid crystal injection hole 222 provided at one side of the first seal pattern 221. After injecting the liquid crystal, the injection hole is blocked by a sealant to prevent the liquid crystal from leaking.

FIGS. 5A to 5E illustrate a method of fabricating the tiling mode display device according to the embodiment of the present invention.

Figure 5A:
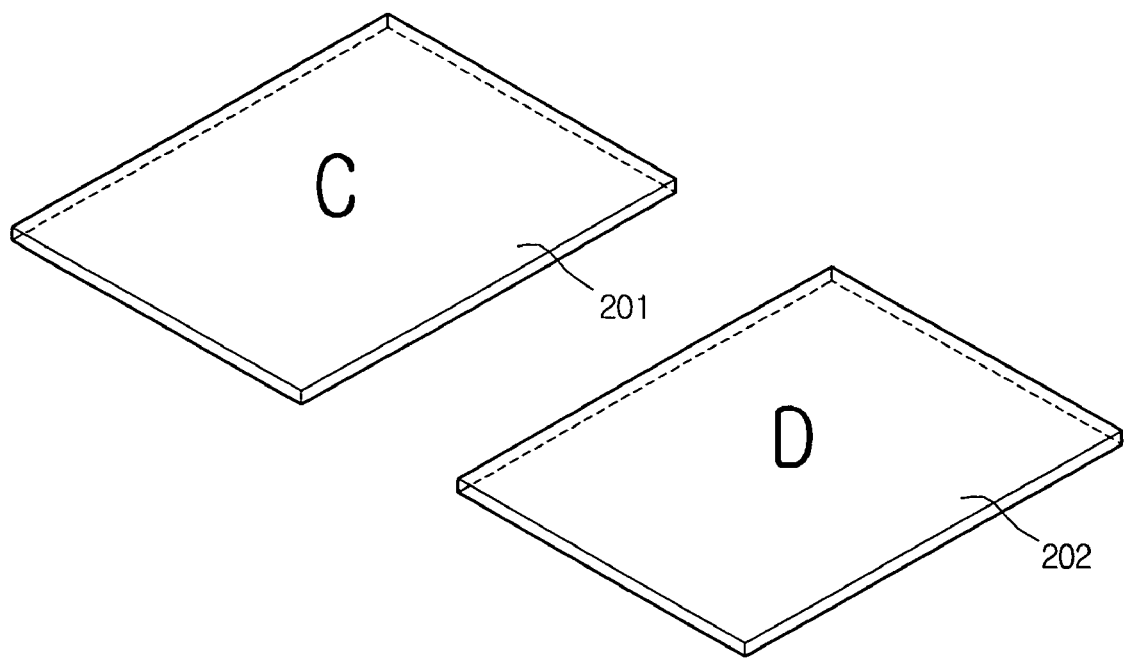
FIGS. 5A to 5E are views illustrating a method of fabricating a tiling mode large display device according to an embodiment of the present invention.

Referring to FIG. 5A, two lower substrates 201 and 202 are prepared to connect two LCD panels (C) and (D) to each other. Each of the lower substrates 201 and 202 of the LCD panels (C) and (D) has a plurality of gate lines and a plurality of data lines (not shown) to cross each other. Additionally, a thin film transistor may be formed at each crossing of the gate lines and the data lines, and the thin film transistor may further include a pixel electrode.

Figure 5B:
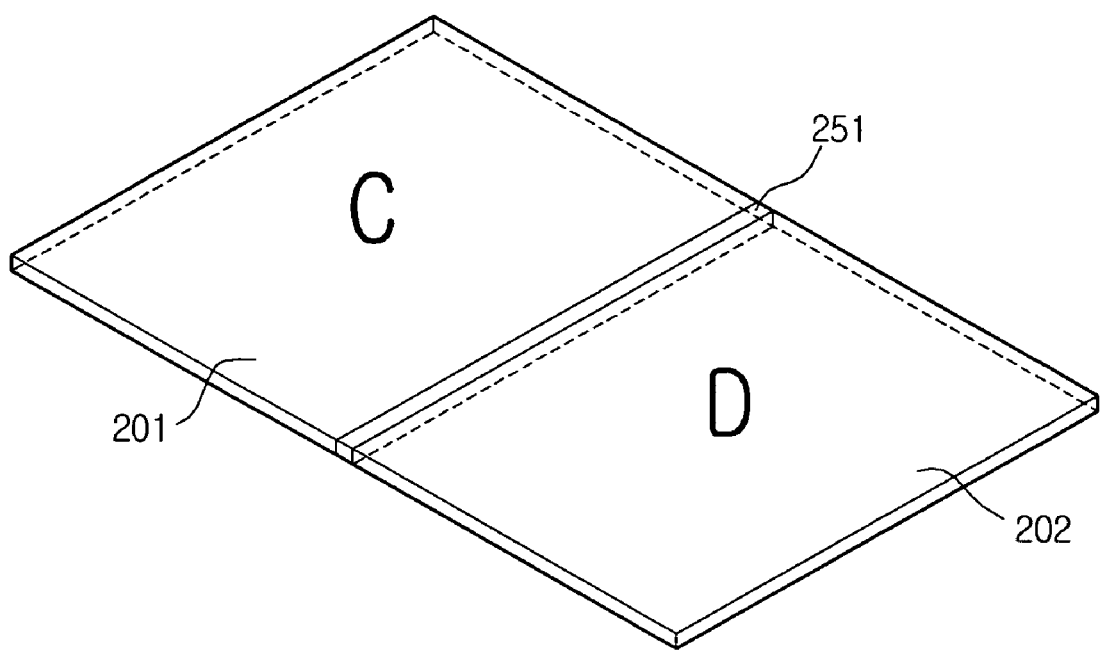
Figure 5C:
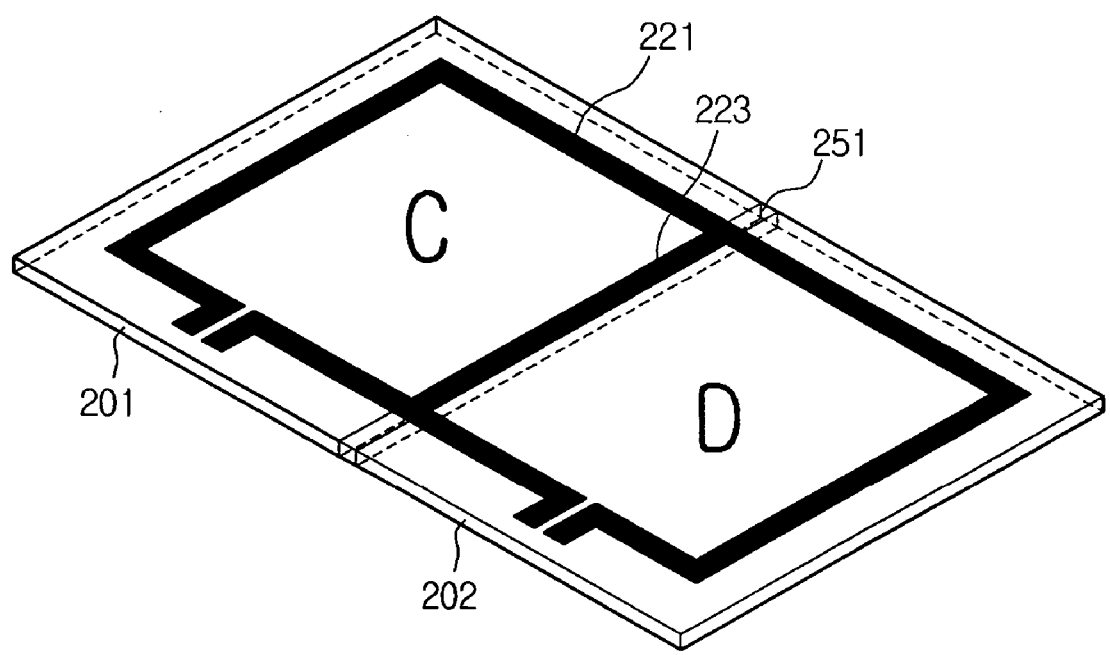

Referring to FIG. 5B, the lower substrates 201 and 202 of the two LCD panels (C) and (D) are connected to each other by a lower-substrate junction member 251. Then, a first seal pattern 221 and a second seal pattern 223 are formed on the lower substrates 201 and 202 of the two LCD panels (C) and (D) connected by the lower-substrate junction member 251, as shown in FIG. 5C. At this time, the second seal pattern 223 is formed on the lower-substrate junction member 251 at a boundary region of the two LCD panels (C) and (D). Thus, only one seal pattern is provided in the boundary region, different from the related art display device in which two seal patterns are provided in the junction region for the two LCD panels, thereby reducing the size of the junction region. A thermoplastic material may be used to form the lower-substrate junction member, such as epoxy. In addition, to increase the adhesion strength, a curing process may proceed after employing the lower-substrate junction member 251 between the two LCD panels (C) and (D). Moreover, to further increase the adhesion strength, the lower substrates 201 and 202 may undergo an etching process to increase the contact area between the lower-substrate junction member 251 and the two lower substrates. When the two lower substrates are glass substrates, then the glass substrates are dipped into a glass etchant, which generally includes HF or the like.

Figure 5D:
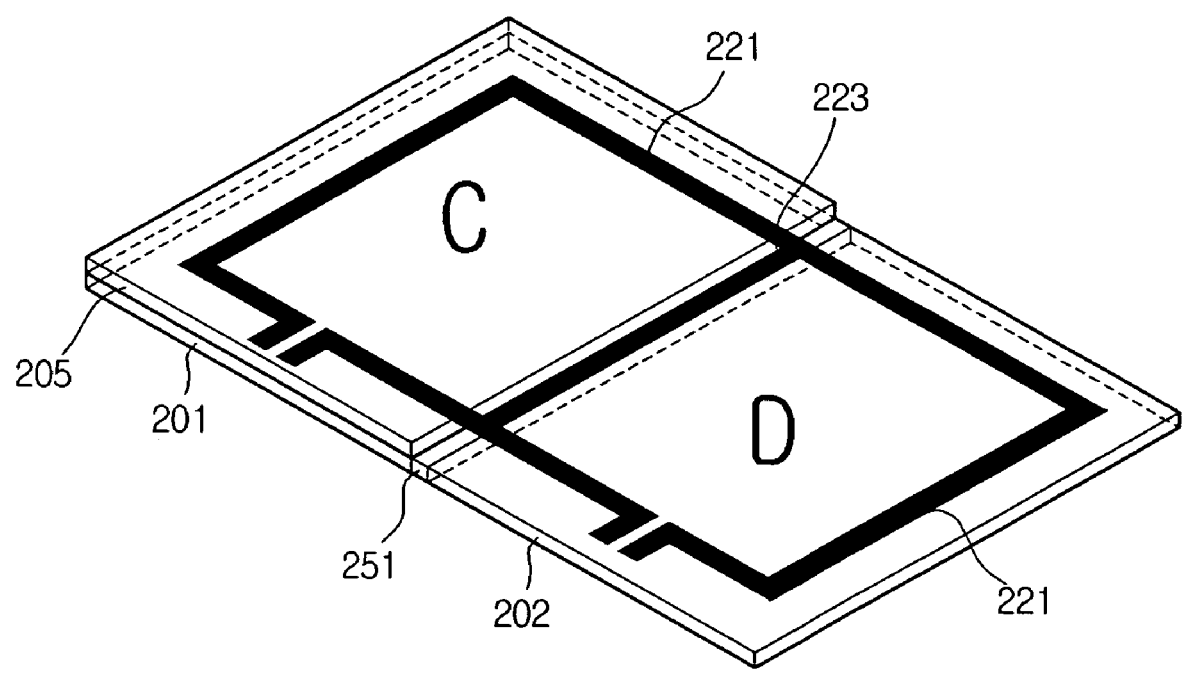
Figure 5E:
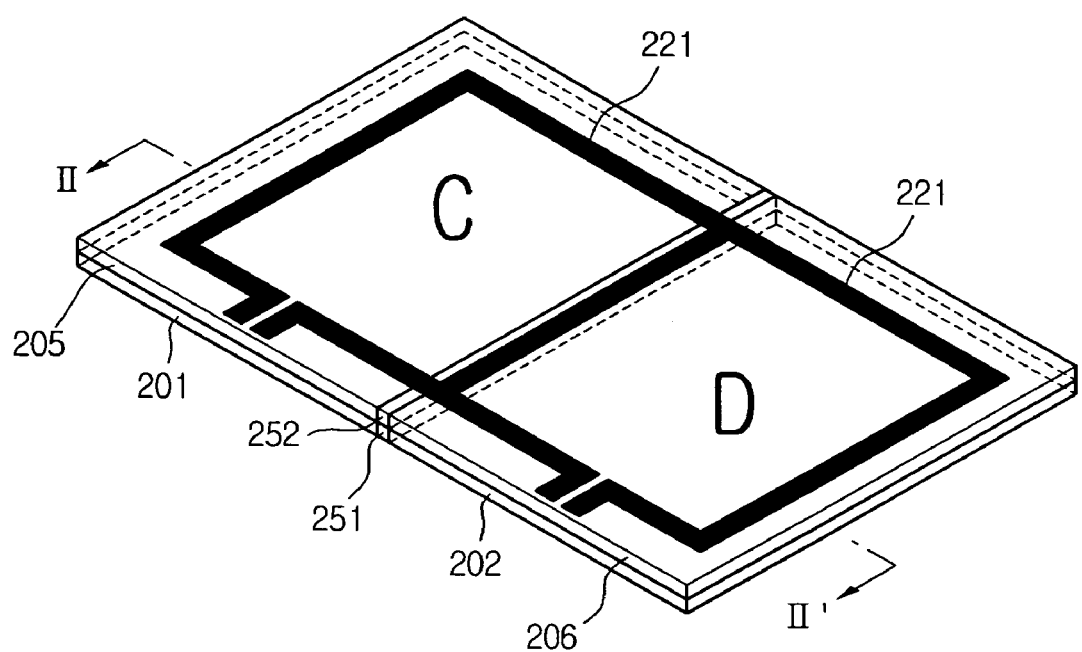

Referring to FIG. 5D, a upper substrate 205 facing the lower substrate 201 of the LCD panel (C) is then placed on and attached to the lower substrate 201. Next, as shown in FIG. 5E, a upper-substrate junction member 252 is formed on one side surface. A upper substrate 206 facing the lower substrate 202 of the LCD panel (D) is then placed on and attached to the lower substrate 202. At this time, the upper-substrate junction member 252 and the lower-substrate junction member 251 are placed at the same position, and have the same material and shape. In other words, the upper-substrate junction member 252 is formed on the lower-substrate junction member 251. Red, green and blue color filters may be formed on the upper substrates 205 and 206 to implement color. Additionally, a black matrix may be formed at a boundary region between the color filters to prevent light leakage, and a common electrode may be formed on the upper substrates 205 and 206 to apply a common voltage thereto. At this point, it should be understood that the principles of the present invention can be applied to various types of displays.

Next, a liquid crystal is injected into the LCD panels (C) and (D), and then a sealing process is performed to complete the fabrication of the tiling mode display device according to the present invention. Although an injecting method is described as a method to provide the liquid crystal in the LCD panels (C) and (D) in this embodiment, other methods such as a drop-filling method are within the scope of the present invention, as these methods are well known in the art.

Figure 6:
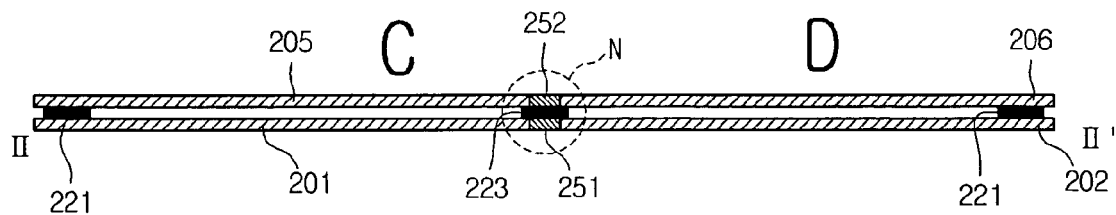
FIG. 6 is a sectional view taken along the line II-II' in FIG. 5E.

FIG. 6 is a sectional view taken along the line II-II' in FIG. 5E.

Referring to FIG. 6, the large-size tiling mode display device according to the embodiment of the present invention includes the first LCD panel (C), the second LCD panel (D), the lower-substrate junction member 251 and the upper-substrate junction member 252. Here, the lower-substrate junction member 251 and the upper-substrate junction member 252 are overlapping each other at the same position. Further, the second seal pattern 223 is formed between the lower-substrate junction member 251 and the upper-substrate junction member 252. Accordingly, a size of the junction region (N), which is in a non-display region, can be reduced, compared with the size of the junction region (M) in the related art.

Figure 7:
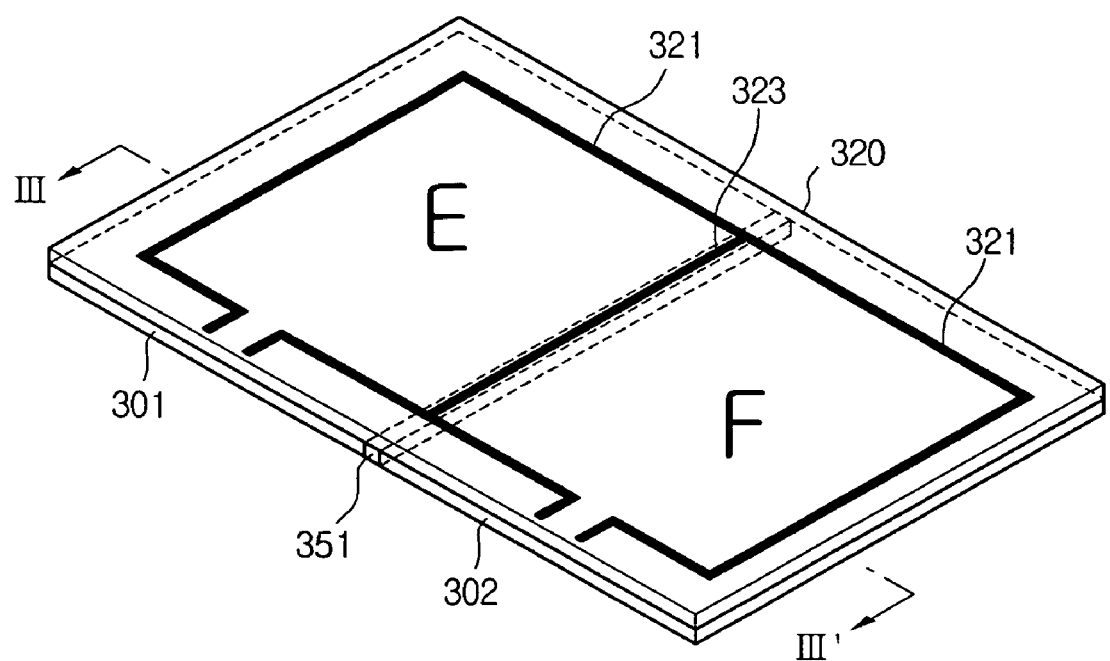
FIG. 7 is a schematic view illustrating a large-size tiling mode display device according to another embodiment of the present invention.
Figure 8:
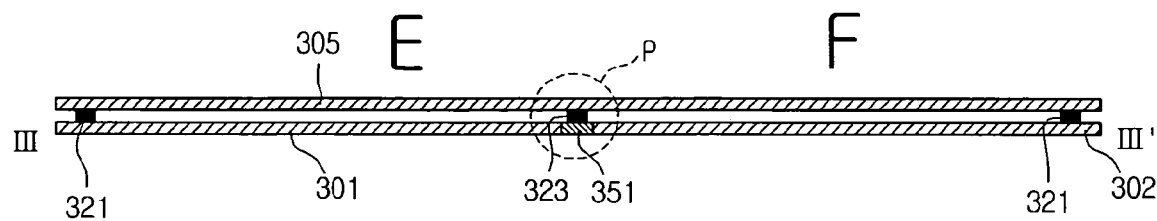
FIG. 8 is a sectional view taken along the line III-III' in FIG. 7.

FIG. 7 is a schematic view illustrating a large-size tiling mode display device according to another embodiment of the present invention, and FIG. 8 is a sectional view taken along the line III-III' in FIG. 7.

A method of fabricating the tiling mode display device will be described with reference to FIGS. 7 and 8. First, two lower substrates 301 and 302 are prepared to connect a first LCD panel (E) to a second LCD panel (F). The lower substrates 301 and 302 of the two LCD panels (E) and (F) are then connected to each other by a lower-substrate junction member 351. A first seal pattern 321 and a second seal pattern 323 are then formed on the lower substrates 301 and 302 of the two LCD panels (E) and (F) connected to each other by the lower-substrate junction member 351. At this time, the second seal pattern 323 is formed on the lower-substrate junction member 351 at a boundary region of the two LCD panels (E) and (F). Therefore, only one seal pattern is provided in the boundary region for the two liquid crystal panels (E) and (F), thereby reducing the size of the junction region.

Next, one large upper substrate 320 is placed on and attached to the two lower substrates 301 and 302 connected to each other. Here, the upper substrate 320 is used as a common upper substrate for the two LCD panels (E) and (F). Here, one upper substrate corresponding to the two lower substrates is illustrated as an example, but the upper substrate can be used as a common upper substrate for a plurality of lower substrates. Accordingly, the first LCD panel (E) and the second LCD panel (F) are connected to each other with a junction region (P).

As described above, the large-size tiling mode display devices according to the embodiments of the present invention can minimize the size of the junction region at which the LCD panels are connected to each other, thereby increasing the screen display region.

In the embodiment described above, the tiling mode display device is explained with examples of LCD devices. However, it should be understood that the principles of the present invention are applicable to other types of display devices including electroluminescence displays (EL).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device comprising:
    a first substrate having at least two lower substrates connected to each other at a first boundary region between the lower substrates using a first adhesion member;
    a first seal pattern at peripheries of the lower substrates;
    a second seal pattern formed on the first adhesion member and portions of the lower substrates, the second seal pattern being shared by the two lower substrates; and
    a second substrate having at least two upper substrates connected to each other at a second boundary region between the upper substrates using a second adhesion member, the second seal pattern formed on the second adhesion member,
    wherein the two lower substrates are joined together using the first adhesion member, and the two upper substrates are joined together using the second adhesion member.

2. The device according to claim 1, wherein the lower substrate comprises:
    a plurality of gate lines and data lines crossing each other;
    a plurality of thin film transistors near crossings of the gate lines and the data lines; and
    a pixel electrode electrically connected with a thin film transistor.

3. The device according to claim 1, wherein the upper substrate comprises:
    red, green and blue color filters; and
    a black matrix at boundary regions of the red, green and blue color filters and a non-pixel region of the color filters.

4. The device according to claim 1, wherein the boundary region of the first substrate is formed by the first adhesion member.

5. The device according to claim 1, wherein the second boundary region of the second substrate corresponds to the first boundary region of the first substrate.

6. The device according to claim 1, wherein the second seal pattern provides space for both of the two lower substrates when providing a liquid crystal for the display device.

7. The device according to claim 1, wherein the display device is an electroluminescence device (EL).

8. The device according to claim 1, wherein a size of the second seal pattern is less than about 1100 µm.

9. The device according to claim 1, wherein the first adhesion member includes a thermoplastic material.

10. The device according to claim 9, wherein the thermoplastic material is epoxy.

* * * * *